(12) United States Patent
Genevie

(10) Patent No.: US 7,284,985 B2
(45) Date of Patent: *Oct. 23, 2007

(54) COMPUTER-IMPLEMENTED METHOD FOR CONDUCTING A JURY SELECTION TRAINING EXERCISE BASED ON MOCK TRAIL DATE

(76) Inventor: Louis Genevie, 340 W. 57th St., Suite 2A, New York, NY (US) 10019

( * ) Notice: Subject to any disclaimer, the term of this patent is extended or adjusted under 35 U.S.C. 154(b) by 491 days.

This patent is subject to a terminal disclaimer.

(21) Appl. No.: 10/465,434

(22) Filed: Jun. 19, 2003

(65) Prior Publication Data

US 2004/0002044 A1 Jan. 1, 2004

Related U.S. Application Data

(63) Continuation-in-part of application No. 10/007,947, filed on Dec. 3, 2001, now Pat. No. 6,607,389.
(60) Provisional application No. 60/309,511, filed on Aug. 3, 2001.

(51) Int. Cl.
*B09B 19/00* (2006.01)

(52) U.S. Cl. ..................................................... 434/235
(58) Field of Classification Search ......... 434/235–236; 705/1, 12, 500
See application file for complete search history.

(56) References Cited

U.S. PATENT DOCUMENTS

| | | | |
|---|---|---|---|
| 5,444,615 A | 8/1995 | Bennett et al. | 364/401 |
| 5,815,392 A | 9/1998 | Bennett et al. | 364/401 |
| 5,940,800 A | 8/1999 | Bennett et al. | 705/1 |
| 6,091,408 A | 7/2000 | Treibitz et al. | 345/329 |
| 6,125,340 A | 9/2000 | Miles | 702/181 |
| 6,205,323 B1 | 3/2001 | Mayo, Jr. | 455/38.2 |
| 6,607,389 B2 * | 8/2003 | Genevie | 434/235 |
| 2001/0053967 A1 * | 12/2001 | Gordon et al. | 703/22 |
| 2003/0018520 A1 | 1/2003 | Rosen | 705/12 |
| 2004/0054546 A1 * | 3/2004 | Levin et al. | 705/1 |

FOREIGN PATENT DOCUMENTS

WO WO 01/43050 A1 6/2001

OTHER PUBLICATIONS

Gobert, James J. et al., "Jury Selection: The Law, Art, and Science of Selecting a Jury", Second Edition, Shepard's/McGraw–Hill, Inc., pp. 128–140.

* cited by examiner

*Primary Examiner*—Kim Nguyen
(74) *Attorney, Agent, or Firm*—Fitzpatrick, Cella, Harper & Scinto

(57) ABSTRACT

A computer-implemented method of conducting a jury selection training exercise for a user based on mock trial data. The method includes presenting juror data for an initial pool of potential jurors on a computer display and providing juror questionnaire response data. The user is allowed to strike members of the initial pool for cause using a computer input device and to make up to a predetermined permitted number of peremptory strikes of members of the initial pool. A probable jury is assembled through computer processing that includes members of the initial pool not struck for cause and not struck using a peremptory strike. A stricken jury is assembled through computer processing that includes members of the initial pool struck for cause or struck using a peremptory strike. Jury deliberation results are presented to the user, including a decision made by each juror of the probable and stricken juries.

38 Claims, 10 Drawing Sheets

COMPUTER-IMPLEMENTED METHOD FOR CONDUCTING A JURY SELECTION TRAINING EXERCISE BASED ON MOCK TRAIL DATE

CROSS-REFERENCE TO RELATED APPLICATIONS

This application is a continuation-in-part of U.S. patent application Ser. No. 10/007,947, now U.S. Pat. No. 6,607,389, filed Dec. 3, 2001 which in turn claims the benefit of U.S. Provisional Application Ser. No. 60/309,511, filed Aug. 3, 2001; both of which are hereby incorporated by reference in their entirety.

BACKGROUND OF THE INVENTION

1. Field of the Invention

This present invention relates to systems and methods, including computer systems and methods, for conducting jury research. More specifically, the present invention relates to processes for providing experiential voir dire training for trial attorneys; for generating research data and analytic tools that help prepare attorneys for more accurate decision making during the actual trial; and to computer systems and methods for simulating a jury selection exercise using real-world data.

2. Description of Related Art

Over the years, jury consultants have played an increasingly important role in developing strategies and tactics for both civil and criminal litigations. Speaking generally, jury consultants assist attorneys by identifying and applying information concerning the beliefs, attitudes and characteristics of potential jurors. Conventional services provided by jury consultants include focus groups, mock trials, opening statement consultations, community attitude surveys, graphics support, witness assessment preparation and the like. In essence, the jury consultant serves as an interface between the attorney and the jury pool, assisting the attorney by making recommendations for getting points across in a persuasive and effective manner.

Conventional methods employed by jury consultants tend to focus on strategy development, and statistical analysis that attempts to model juror types. For example, in a conventional mock trial exercise, the jury consultant attempts to construct a jury that is a random and representative sample of the overall jury pool in the relevant area (a "representative jury"). The construction of such a representative jury often begins with a telephone survey, in which a statistically significant sample of the community in which the case is to be tried is questioned, to determine its attitude patterns and demographic make-up. Depending on the specific nature of the case, the survey may focus on a variety of factors, including marital status, occupation, membership in community groups and the like, as well as other factors more specifically related to the particular case. The jury consultant then makes an effort to construct a representative jury that mirrors that community's profile.

A mock trial is then conducted before the representative jury, in which both the plaintiff's (or prosecutor's) and defendant's sides of the case are presented. Following the mock trial, the representative jury deliberates and renders a verdict. Each member of the representative jury is then polled and interviewed, to elicit his or her reactions to what was presented. The jury consultant compiles and analyzes that data from such interviews, and makes recommendations to the attorney concerning the manner in which the case may be most effectively presented. Data concerning biases and characteristics of jurors that may help or hurt the case is also analyzed.

For example, following an observation of the mock deliberations, the jury consultant may conclude that an aggressive cross-examination of a particular witness did not sit well with the jury, and in fact alienated the cross-examining attorney from its sympathies, and therefore recommend that a less aggressive approach to the cross be taken. By way of another example, the exercise outlined above may reveal that seventy percent of the representative jurors who were blue-collar workers found for the plaintiff, while eighty percent of the representative jurors who were white collar workers found for the defendant. From this data, the jury consultant may conclude that there are strong corresponding pro-plaintiff and pro-defendant biases in the subject case, and recommend to the attorney that his peremptory strikes (i.e., strikes as to which a showing of cause is not required) be used accordingly.

Over the long run, the statistical data obtained using the representative jury approach described above may prove useful, and conventional jury consultant have in fact provided valuable and necessary services to attorneys trying cases. However, even the strongest correlation between jurors' decision making and various aspects of their background, attitudes and experiences provides nothing more than probabilities, and falls short when tested against the complexity of decision making during voir dire. This drawback is even more acute when one considers that it is individuals who do not think like everyone else, and therefore do not conform to the probability data, who tend to become leaders in jury deliberations. These factors severely limit the usefulness of probability data in conducting a voir dire. In the end, no matter how much statistical data one has available, counsel are still required to rely on personal judgment, experience and so-called gut instincts when making actual jury selection determinations.

Despite these truisms, there has been very little qualitative research focused on the critical area of jury selection. Moreover, no systems or methods have been heretofore developed for effectively training an attorney to make jury selections in the specific case he will be trying, or for constructing a mock jury which mirrors the jury that will hear the case more accurately than the representative jury of the prior art. It has been suggested to conduct mock voir dires to generate the mock jury for a mock trial. *See Jury Selection The Law, Art, and Science of Selecting a Jury*, 2nd Ed., J. J. Gobert and W. E. Jordan (Shepard's/McGraw Hill 1990) at 130–131. However, no systematic approaches for conducting such mock voir dires, and for analyzing and utilizing the resultant data, have been heretofore developed. Moreover, such practices have been criticized as being time consuming. Id.

Also, an attorney training organization the National Institute for Trial Advocacy (NITA) has offered programs in which mock voir dires are conducted. At the NITA program, an attorney being trained conducts a mock voir dire before a trial advocacy instructor or a professional communicator, with the end product of the exercise being a a critique on the attorney's questions and presentation skills. The NITA programs, however, do not at all focus on the gathering and analysis of data from the mock voir dire process.

There is a need, therefore, for a system and method that fills these voids, and provides a trial attorney with formal voir dire training, while at the same time developing an ever more refined set of analytic and data gathering tools for improving voir dire practice.

SUMMARY OF THE INVENTION

It is an object of the present invention to provide systems and methods for assisting a trial attorney or a trial team in conducting jury research prior to trial.

It is another object of the present invention to provide systems and methods in which mock trial exercises are conducted before mock juries that resemble more closely the actual jury that will hear the case.

It is a still another object of the present invention to provide systems and methods that provide a trial attorney and a trial team with jury selection experience that is specifically relevant to the case that will be tried.

It is yet another object of the present invention to provide jury consulting methodologies that yield greater accuracy in outcome prediction, and a better understanding of what issues the actual jury will find important.

It is yet another object of the present invention to provide jury consulting methodologies that provide an intense clash of the issues in the case, creating a better understanding of how key case issues work their way through the deliberation process.

It is yet another object of the present invention to provide jury consulting methodologies that allow for the analysis of strike decisions in relation to what mock jurors actually do during deliberations, thereby allowing the attorney or trail team to see firsthand whether and to what extent their perceptions of individual jurors were accurate, where their perceptions fell short, and why.

It is still another object of the present invention to provide jury consulting methodologies that create a data base of stealth plaintiff and defense jurors and leadership types, creating a database of difficult to identify jurors.

In one aspect, the present invention provides a method and computer code for conducting a jury selection training exercise for a user based on mock trial data. The method includes presenting juror data for an initial pool of potential jurors and providing juror questionnaire response data for members of the initial pool. The questionnaire resembles as closely as possible a questionnaire that would be given to a venire during an actual trial. The method further includes allowing the user to strike members of the initial pool for cause, in a manner that resembles as closely as possible a manner in which members of the venire would be struck for cause during the actual trial, and allowing the user to make a predetermined number of peremptory strikes of members of the initial pool, the number of peremptory strikes permitted corresponding as closely as possible to the number of peremptory strikes that would be permitted at the actual trial. A probable jury is assembled including members of the initial pool not struck for cause and not struck using a peremptory strike. A stricken jury is assembled including members of the initial pool struck for cause or struck using a peremptory strike. The method further includes presenting jury deliberation results to the user, the deliberation results including a decision made by each juror of the probable jury and each juror of the stricken jury.

In another aspect, the present invention provides a method and computer code for conducting a jury selection training exercise for a user based on mock trial data. The method includes presenting a juror pool data screen for an initial pool of potential jurors. The method further includes indicating, on the juror pool data screen, members of the initial pool who have been struck for cause and members of the initial pool who have been struck using a peremptory strike. A probable jury is presented comprising members of the initial pool not struck for cause and not struck using a peremptory strike. A stricken jury is presented comprising members of the initial pool struck for cause or struck using a peremptory strike. Jury deliberation results are presented to the user, including a decision made by each juror of the probable jury and each juror of the stricken jury.

Embodiments of the present invention may include one or more of the following features. The juror pool data screen may include icons representing each member of the initial pool. An individual juror data screen may be presented for a member of the initial pool based on a selection made by the user on the juror pool data screen. The presentation of the jury deliberation results to the user may include presenting a jury deliberation results screen summarizing the decisions made by jurors of the probably jury or jurors of the stricken jury or both. An individual juror result data screen may be presented for a member of the probable jury or the stricken jury based on a selection made by the user on the jury deliberation results screen. A score may be presented based on the decisions made by jurors of the probable jury. The score may be based in part on the decisions made by jurors of the stricken jury.

In another aspect, the present invention provides a system for conducting a jury selection training exercise for a user based on mock trial data. The system includes a client computer configured to present juror pool data for an initial pool of potential jurors, allow the user to strike members of the initial pool for cause or using a peremptory strike, and present jury deliberation results to the user. The system further includes a database server configured to store the juror pool data and transmit the juror pool data to the client computer. The deliberation results include a decision made by each juror of a probable jury comprising members of the initial pool not struck for cause and not struck using a peremptory strike and each juror of a stricken jury comprising members of the initial pool struck for cause or struck using a peremptory strike.

Embodiments of the present invention may include one or more of the following features. The database server may store individual juror result data for a member of the probable jury or the stricken jury and the client computer may present the individual juror result data to the user. The individual juror result data may include video of deliberation by the member of the probable jury or the stricken jury. The client computer may be connected to the database server via a Web server.

DETAILED DESCRIPTION OF THE PREFERRED EMBODIMENTS

Figure 1:
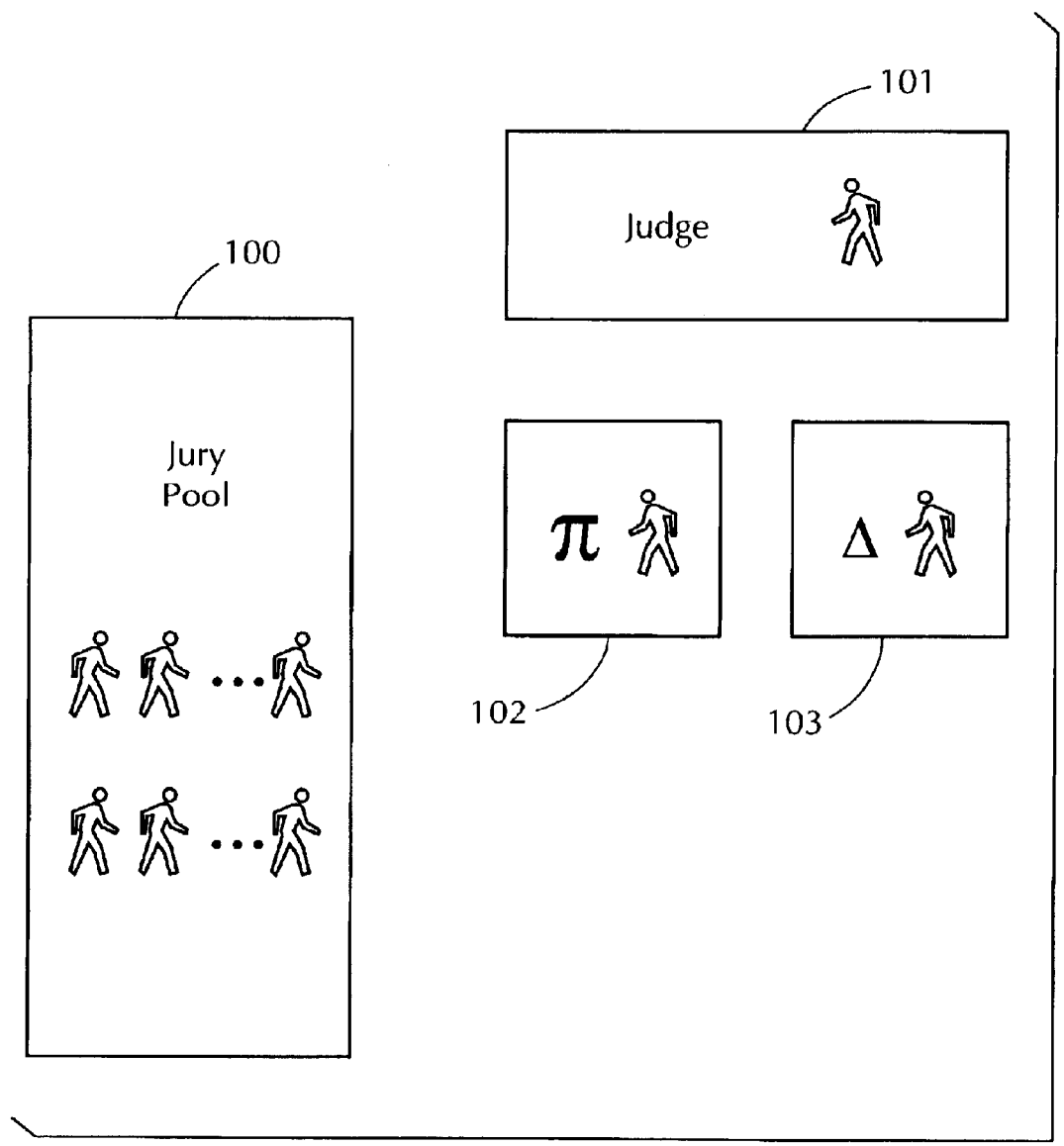
FIG. 1 is a block diagram illustrating the various parties that may be involved in the practice of the present invention.

As used herein, the term "computer" may refer to a single computer or to a system of interacting computers. Generally speaking, a computer is a combination of a hardware system, a software operating system and perhaps one or more software application programs. Examples of computers include, without limitation, IBM-type personal computers (PCs) having an operating system such as DOS, Windows, OS/2 or Linux; Macintosh computers; hardware having a JAVA-OS operating system; graphical work stations, such as Sun Microsystems and Silicon Graphics Workstations having a UNIX operating system; PalmPilots; and Pocket PCs.

"Network" means a connection between any two or more computers, which permits the transmission of data. An example of a network, although it is by no means the only example, is the Internet.

"Web page" means any documents written in mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web site" means at least one Web page, and more commonly a plurality of Web pages, virtually connected to form a coherent group.

"Web browser" means any software program which can display text, graphics, or both, from Web pages on Web sites. Examples of Web browsers include, without limitation, Netscape Navigator and Microsoft Internet Explorer.

"Web server" refers to a computer or other electronic device which is capable of serving at least one Web page to a Web browser.

The phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

For the present invention, a software application could be written in substantially any suitable programming language, which could easily be selected by one of ordinary skill in the art. The programming language chosen should be compatible with the computer by which the software application is executed, and in particular with the operating system of that computer. Examples of suitable programming languages include, but are not limited to, C, C++, CGI, Java and Java Scripts. Furthermore, the functions of the present invention, when described as a series of steps for a method, could be implemented as a series of software instructions for being operated by a data processor, such that the present invention could be implemented as software, firmware or hardware, or a combination thereof.

Speaking generally, the present invention is practiced by conducting a mock jury selection process, following the rules of the court in which the case is to be tried, to develop one or more probable juries and one or more stricken juries. As the terms are used herein, a probable jury is a panel consisting of those individuals who have been selected during a mock jury selection process, after all for cause and peremptory challenges have been made; and a stricken jury is a panel consisting of those individuals who have been struck, either for cause or using a peremptory challenge, during the mock jury selection process.

The mock jury selection process yields a substantial amount of mock trial data, such as for example the decisions made by each member of the probable and stricken juries and text and/or video records of jury deliberations. Such data may also be generated by having one skilled in the field of jury selection create a set of hypothetical jurors with certain characteristics and then hypothesize the decisions made by the jurors and the associated deliberations. The mock trial data is recorded in digital form for use injury selection training exercises using the software of the present invention. Because the software allows the attorney to experience the voir dire process and the resulting jury decisions and deliberations, the attorney is provided with a directly relevant training experience that will allow the attorney to select more effectively a panel in an actual trial.

In order for the practice of the methods of the present invention to yield its maximum benefits to the attorney undergoing the training exercise, the mock voir dire used to generate the mock trial data should be conducted in a manner that resembles the manner in which the actual voir dire will be conducted at trial. Thus, knowledge of all applicable statutes and rules that will govern the trial is important, as is knowledge of the rules and predilections of the judge who will be presiding. Accordingly, to the extent that it is possible, such statues, rules and predilections should be learned before and followed. By way of example, if a case is to be tried before a certain judge who is know to use a specific questionnaire in examining the venire, then a questionnaire of that type should be used during the mock voir dire exercise. By way of another example, if the subject case is a federal civil lawsuit, in which by statute each side is permitted three peremptory challenges, then each side should be permitted three peremptory challenges during the mock exercise. Speaking generally, the more closely the mock exercise resembles the actual exercise, the more useful the data obtained from the mock exercise will be.

With reference to FIG. 1, the participants in the mock exercise include a mock judge 101, an attorney or attorneys 102 for the plaintiff (or the prosecutor), an attorney or attorneys for the defendant, and a mock jury pool 100 from which the probable jury or juries and stricken jury or juries will be obtained. If the actual case is more complex (such as for example a multi-defendant case) then it is preferable to include additional participants in the mock exercise (such as for example an attorney for each defendant). The mock exercise may be conducted in any suitable location, such as for example in a mock courtroom maintained at the jury consultant's facility, or at the law offices of the attorney commissioning the exercise. Other locations are possible as well.

Typically, the role of the attorney for the side commissioning the exercise will be played by the attorney who will act as lead counsel for that side at trial; and the attorney for the opposing side will be a colleague (such as, for example, a partner or associate) of such lead counsel. The role of the mock judge may be played by the jury consultant, by another colleague of the lead attorney or by a third-party, such as for example a retired judge, retained specifically for the exercise. Other configurations are possible as well, although it is most preferable that the attorney who will act as lead counsel for the commissioning side at trial play that role during the mock exercise, since that will maximize the training benefit of the present invention. It is important that each participant play his or her role as honestly and zealously as possible, for the exercise to yield the maximum benefits.

The jury pool 100 from which the probable juries and stricken juries are to be obtained should provide a representative sample of the community in which the case is tried, such that it mirrors the actual jury pool as closely as possible. Thus, those who are disqualified from jury service, such as for example minors, should not be included in the jury pool 100. Also, if there are certain groups in the community who are permitted to and do routinely exempt themselves from service, such as for example doctors, lawyers and police officers, then no such individuals should be allowed in the jury pool 100. Speaking generally, the jury pool 100 may be collected in the same manner in which the representative juries used in conventional jury consulting methodologies are obtained, taking into account demographic considerations and the like. The number of people needed for the jury pool 100 will typically be greater than the number of people needed to construct a representative jury, since it is from this pool that two juries (i.e., a probable jury and stricken jury), or more, will be created. The actual number of people needed for the jury pool 100 varies with the number of groups desired (i.e., the number of probable juries and stricken juries desired); the number of jurors that will sit or are likely to sit on the panel at trial; and the manner in which strikes for cause and peremptory challenges are handled during the exercise.

Once the jury pool 100 is constructed and assembled, each member of the pool fills out a detailed questionnaire, eliciting some core information about the potential juror, as well as information concerning the potential juror's attitudes, experiences and biases related to the case. An exemplary completed questionnaire may look as follows:

| | |
|---|---|
| Name: | John Smith |
| Age: | 35 |
| Sex: | Male |
| Health: | Good |
| Occupation: | Electrical Equipment Sales |
| Military Service: | Navy, 4 years |
| Education: | B.A. |
| Married: | Yes |
| Children: | 2: 3 years and 5 years |

Preferably, the questionnaire will call also for additional information, more specific to the case at hand. For example, if the case is a civil suit brought by a patent holder against an alleged infringer, the questionnaire might call for some history regarding the potential juror's prior experience with patents, such as for example asking whether the potential juror has ever been named as an inventor. In any event, the specifics of the questionnaire should mirror as closely as possible those of the questionnaire that the presiding judge is likely to use during the actual trial.

Once each member of the jury pool 100 has filled out his or her questionnaire, the mock voir dire process commences. As discussed above, the format that is used to conduct the mock voir dire process should conform to the voir dire process that will be used by the trial judge as closely as possible. Thus, the uses of initial panel conditioning, judge conducted voir dire, counsel conducted voir dire, open voir dire, etc., in the mock exercise, are all dependent upon their uses in the actual trial, to the extent that that is known. If the presiding court will allow the attorneys to examine completed juror questionnaires during the actual process, then the attorneys should be shown prior to or during the mock voir dire, the questionnaires completed by the potential mock jurors. In some courts, the manner in which jury selection is conducted is prescribed closely by rule or statute, and in such cases those rules or statutes should be adhered to. In other courts, the trial judge is given tremendous discretion as to how jury selection is to proceed, and in those cases it is preferable for the specific judge's methodologies to be known and adhered to.

It is central to the present invention that the process provide for the striking of potential jurors, on both for cause and peremptory bases. For cause strikes may be made at the initiative of the judge 101, or may be requested by either attorney 102 or 103, and ruled upon by the judge 101. The strikes for cause should be made and/or ruled upon by the judge 101 in a manner that approximates the manner in which the actual judge will rule upon them as closely as possible. For example, if the judge is known to liberally allow strikes for cause, then strikes for cause should be liberally allowed during the mock exercise.

The number of peremptory challenges allowed to each side during the mock exercise should match the number of challenges that will be allowed at trial. Often, this number is fixed by statute. For example, in a federal civil case, each side is allowed a maximum of three peremptory challenges, and if this is the type of case being emulated then that is the number of peremptory strikes that should be allowed. The judge 101 should also evaluate the appropriateness of peremptory strikes, and in certain limited situations (such as for example Batson violation situations) not allow a particular peremptory strike to be made. Such circumstances should be relatively unusual, however, and by and large the peremptory challenges made by the attorneys 102 and 103 will result in a corresponding strike.

Figure 2:
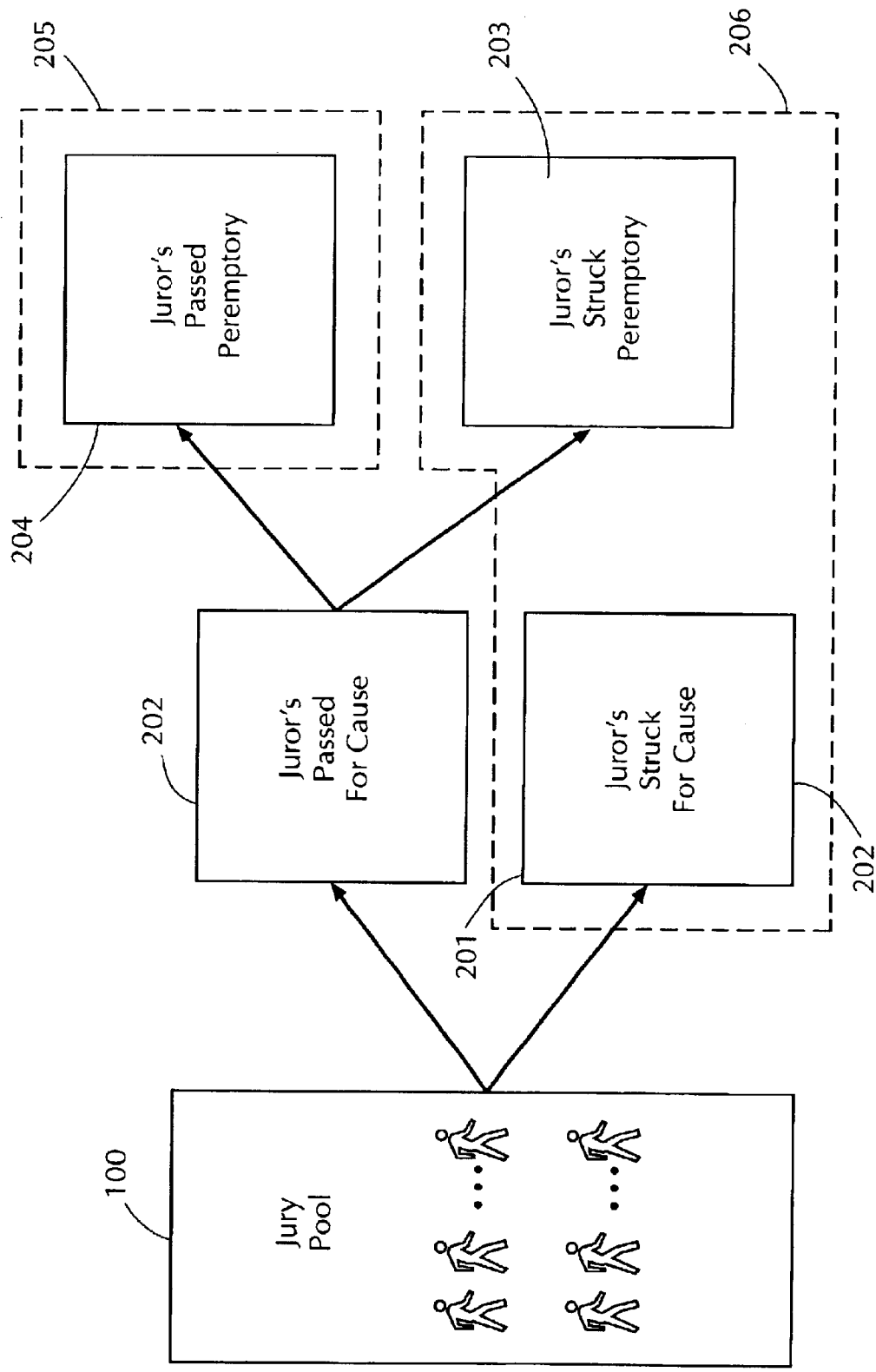
FIG. 2 is a block diagram illustrating the composition of a probable jury and a stricken jury.

FIG. 2 depicts schematically the manner in which a probable jury and a stricken jury are obtained from the jury pool 100. Following the examination of jury pool members (by questionnaire and/or by oral examination, as the case may be), certain jury pool members are struck for cause, either at the initiation of the judge 101, or at the request of the attorneys 102 and 103 as decided upon by the judge 101. Two or more groups are thereby extracted from the jury pool 100: a group 201 of potential jurors who were struck for cause; and a group 202 of potential jurors who passed the for cause evaluation. Next, the attorneys 102 and 103 each apply their peremptory strikes to the group of potential jurors 202, to refine that group into two more groups: a group 203 of potential jurors struck by either attorney's use of a peremptory challenge, and a group of jurors 204 who passed the peremptory strike procedure. As illustrated in FIG. 2, the probable jury 205 comprises those jurors who have passed both the strike for cause and peremptory challenge procedures; and the stricken jury 206 comprises those potential jurors 201 who have been struck for cause and those potential jurors 203 who have been struck using peremptory challenges.

A mock trial exercise is then conducted before both the probable jury 205 and the stricken jury 206. The term mock trial is being used here in its broadest sense, to mean an exercise in which both the plaintiff's (or prosecutor's) and defendant's cases are presented. The mock trial exercise could range from having each attorney 102 and 103 present a brief summary of his or her case; to an exercise in which opening statements, closing arguments and key witness testimony are presented; to a complete mock trial that very closely approximates the actual trial that will be conducted.

Graphics, computer animation, demonstrative exhibits and physical evidence, to the extent that it will be used or is likely to be used at trial, may be presented as well.

In a case in which witness testimony is presented, the roles of the witnesses to be presented by the commissioning side are preferably played by the actual witnesses themselves, to the extent that they are available for the exercise. The witnesses to be presented by the opposing side, on the other hand, and to the extent that they are known, generally will not be available for the mock exercise, and their roles accordingly need to be played by others involved in the exercise, such as for example colleagues of the commissioning attorney, or members of the jury consultation team. Preferably, the judge 101 will preside over the mock trial exercise, and rule on all objections in a manner that approximates the manner in which the actual trial judge will likely rule as closely as possible.

Following the presentation of the mock trial exercise before the probable jury 205 and the stricken jury 206, each jury deliberates separately, and renders its verdict on the outcome of the case. Preferably, before the deliberations begin, the judge 101 will instruct the juries, and present the juries with specific charges, that mirror the instructions and charges that are likely to be given to the jury at trial. The deliberations of the probable jury 205 and the stricken jury 206 may be conducted in secret, or alternatively, and in many instances preferably, may be observed by the attorney or attorneys commissioning the exercise, and by the jury consultation team. In the latter case the two juries might deliberate one after the other, so that each of the deliberations may be effectively observed. Whether or not the actual deliberations are observed, each juror (both probable and stricken) should be interviewed following the deliberations, to elicit his or her reactions to the cases that were presented. Preferably, both the deliberations and the interviews are videotaped or recorded in some other suitable fashion, for subsequent detailed review by the attorney and/or consultants.

Since the probable jury 205 is a closer emulation of the actual jury that will hear the case than the representative jury of the prior art, the probable jury 205 and the reactions of its members provides a clear identification and understanding of the facts and issues in the case that are most likely to impact a real jury. At the same time, by utilizing in addition the stricken jury 206, head to head discussions by jurors perceived as most likely to strongly support each side of the case, and an intense clashes of key issues, are provided. Thus, the use of the methodologies of the present invention provide at least two innovative and extremely useful analytical data sets: the ability to focus on the reactions of probable jurors to arguments and evidence; and the ability to analyze strike decisions in relation to what jurors actually do during mock deliberations. The former will help the trial team focus their trail preparations on the issues likely to be important to the actual jury. The latter will allow the trial team to assess whether its perceptions of each individual juror were accurate or inaccurate, thereby improving its abilities to conduct questioning of the venire, to move for strikes for cause and to make peremptory challenges and gaining an understanding of the viewpoints and arguments of stricken jurors.

Speaking generally, something can be learned from analyzing the behavior of each juror during voir dire, during deliberations and during the post deliberation interview. Of particular value is the behavior of difficult to predict jurors, especially stealth jurors who hide their true predilections during the voir dire process. Thus, each juror is assessed initially by comparing voir dire responses to his or her behavior during deliberations.

All resultant data is analyzed in an effort to determine errors made by the commissioning attorney during the mock voir dire process. The inclusion in the probable jury 205 of a juror who favors the opposition's side, and in particular the inclusion of an opposition leader, is classified as a Type I error, and is given the highest priority. All available data—including questionnaire responses, oral voir dire responses, juror behavior during deliberations and juror reactions during the follow up interview—are brought to bear on identifying relevant characteristics of such un-struck opposition jurors. The presence in the stricken jury 206 of a juror favorable to the striking attorney's side, or of a juror who does not play a significant role during deliberations, is classified as a Type II error. Such errors are also analyzed in an effort to understand them, since they result in the useless strikes, or worse in strikes that do more harm than good.

When necessary, follow up interviews are conducted with mock jurors who were not evaluated correctly in order to understand why a correct evaluation was not made. Questions include: What was missed during the voir dire process? and What questions should have been asked that would have helped identify the individual's bias correctly? and the like. Broad ranging, detailed, one on one interviews focused on relevant aspects of the individual's experience are recommended.

In addition to the voir dire data, the claimed method also produces probable and stricken juries which are analyzed separately for their strategic and predictive value. Probable and stricken juries are also compared to determine if and in what ways probable juries see the case differently than stricken juries. This data is important as it may suggest a strategic refocusing of the case.

Also, because so few cases ever go to trial, most attorneys have limited voir dire experience. Attorneys' participation in this program produces substantial voir dire experience. The present invention provides trial attorneys with significant experience with respect to the development of voir dire and jury selection skills, consistent with the type of voir dire in which he or she is likely to participate.

The foregoing is intended to be illustrative and not limiting of the present invention, which is defined by the claims set forth below. For example, although the methods above are described for the sake of simplicity in terms of a single probable jury 205 and a single stricken jury 206, the mock voir dire process of the present invention could be conducted multiple times, generating multiple probable juries and stricken juries, all of which hear the case during the mock trial exercise. Various other modifications are possible as well.

In another extremely advantageous aspect of the present invention, a computer system is provided in which a lawyer or other individual interested in jury selection training (generally hereinafter referred to as a "user") can realize such training in a virtual environment, and gain valuable knowledge without participating in an actual mock voir dire exercise.

Figure 3:
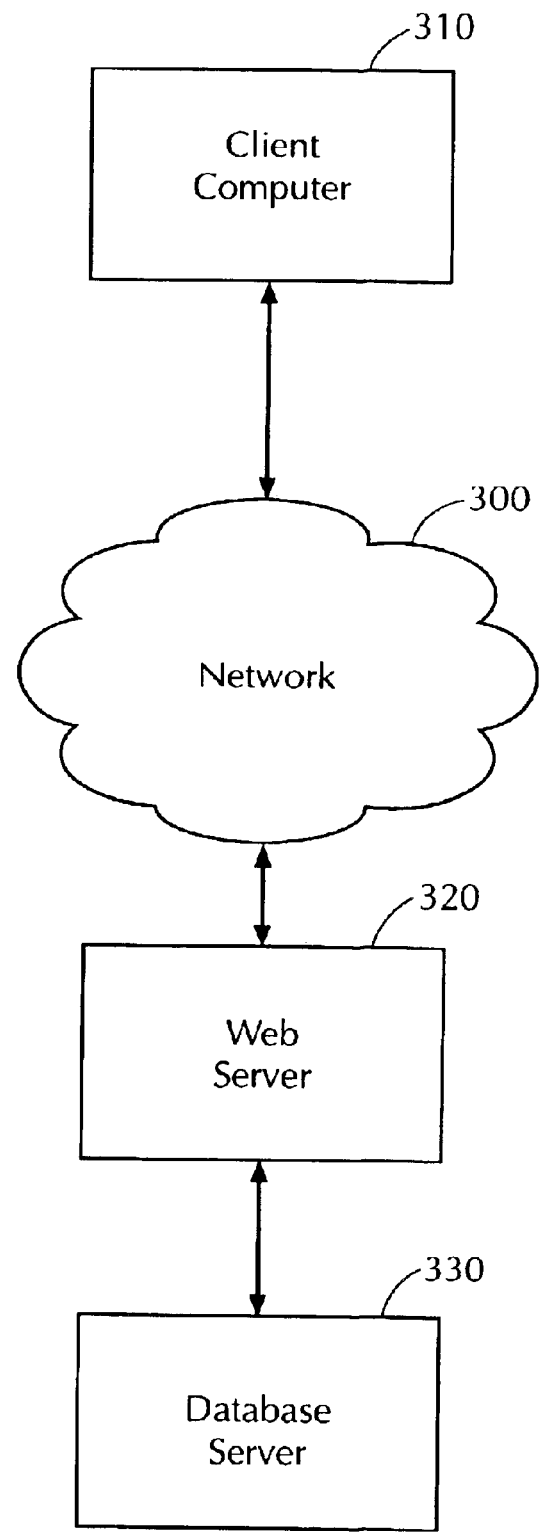
FIG. 3 is an example of a computer system that may be used to implement the present invention.

An example of this aspect of the present invention is depicted schematically in FIG. 3. As shown, the system includes a Web server 320 operably connected to a database server 330 and a network 300. The network 300 may be, for example, the Internet. Also connected to the network 300 is a client computer 310 (such as for example a client computer located in the office of an attorney), with which the user will interact directly.

In the configuration of FIG. 3, the Web server 320 and/or a database server 330 store and/or run the software and data necessary for the implementation of the present invention. The database server 330 may comprise a relational database management system, in which stored information is arranged in tables of rows and columns (or in records having defined fields), related to one another by predetermined functions, and can be accessed by database query protocols, such as the Structural Query Language (SQL). Other configurations are possible as well.

The client computer 310 preferably includes communications hardware and an operating system with graphical user interface (GUI) functionality to allow for interface with the Internet, and is preferably equipped with graphical World Wide Web (Web) browser software, such as Netscape Navigator or Microsoft Internet Explorer, loaded thereon and operable to read and send Hypertext Markup Language (HTML) forms from and to a Hypertext Transport Protocol (HTTP) server on the Web. Preferably, the client computer 310 is operable to act as a virtual machine to run Java applets, or the like, downloaded by the browser from the server. The Web server 320 preferably includes hardware, HTTP compliant software, an operating system and common gateway interface (CGI) software for interfacing with input queries and sources of data. The Web server 320, running software in accordance with the present invention and interacting with data stored in the database server 330, is accessed by the client computer 300, thereby allowing a user to be provided with jury selection training.

It will be readily appreciated that the schematic of FIG. 3 is exemplary only, and that numerous variations are plainly possible. For example, each of the computers 310 and 320 may be connected to their own network, which networks in turn are connected to the network 320. The system may also be implemented with multiple client computers and multiple Web servers. Also, the network 300 may be a local area network (LAN), and metropolitan area network (MAN) or a wide area network (WAN) other than the Internet. Alternatively, the invention may be implemented without client-server architecture and/or without any network at all; instead, all software and data necessary for the practice of the present invention may be stored on storage device (such as, for example, a CD-ROM), which is accessed locally by a user's computer. Other variations exist as well.

Speaking generally, the software of the present invention (which may, by way of example, be running on the Web server 320) sequentially accesses a database of profiles (which may, by way of example, be stored on the database server 330), with each profile corresponding perferably to an individual who has been a juror or a member of the venire in an actual trial, or has participated in the mock voir dire process outlined above, such as for example as member of the probable jury or of the stricken jury. The database also includes all data compiled during the actual or mock voir dire process, including questionnaire responses, oral voir dire responses, juror behavior during deliberations and juror reactions during the follow up interviews.

Figure 4:
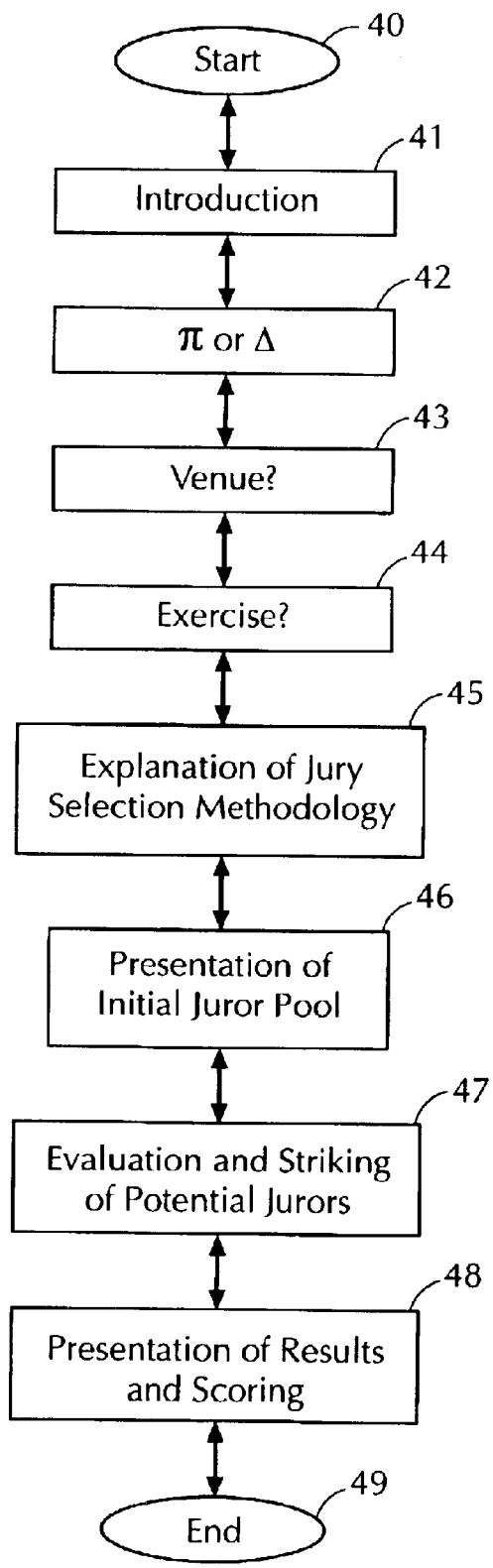
FIG. 4 is a flow chart of the operation of the software of the present invention.

The flow chart of FIG. 4 illustrates the operation of the software of the present invention. The software is started (step 41) by the user, for example by initiating execution of the software on the client computer 310 or by accessing a Web site on the Web server 320. In the latter case, the Web site may have limit access, for example by requiring a password, to allow only authorized users to access the software. Such a password protection technique may be used when the software is stored locally as well.

Once the software has been started, the user is present with an introduction sequence (step 41) that provides instructions to the user on how to use the software. Experienced users may bypass the introductory material by clicking on a button or hyperlink provided for that purpose. Otherwise, the user will review the introductory material, which may be provided on a sequence of screens or Web pages that the user steps through on a screen-by-screen or page-by-page basis. There may also be video and/or audio clips or streaming video and/or audio providing detailed instructions on how to prepare for and run the training exercise. This instructional information may have interactive capabilities to allow the user to access information relating to particular aspects or details of the training exercise. Following the introductory material, the user sequences through a series of screens or Web pages that prompt the user for certain configuration information, such as whether the user will act as plaintiff ($\pi$) or defendant ($\Delta$) (step 42).

The user also will be prompted to select the venue (step 43), i.e., the Court in which the exercise will take place, which may be selected from among a set of predefined venues for which information is stored in the database server 330. For each predefined venue, the database server 330 has venue-specific information, including all applicable statutes and rules that will govern the trial in that venue, such as for example the number of peremptory challenges permitted. Predefined venues may be any venues in which jury trials are conducted, such as for example: the United States District Court for the Southern District of New York; the U.S. District Court for the Northern District of California; and the U.S. District Court for the District of Delaware. State court venues, and other venues, may be used as well. The database server 330 may also have information on specific judges in each venue, such as questionnaires used by the judge in examining the venire, whether the judge is known to liberally allow strikes for cause, and the judge's particular jury selection methodology to the extent that it is not fixed by local rules and statutes.

Once the venue has been selected (step 43), the user selects a particular training exercise from among a set of predefined exercises (step 44). Each exercise is preferably based on an actual or mock jury selection and/or deliberation, and possibly an actual or mock trial, that has been conducted for the selected venue. For example, a list of available exercises may be presented as follows:

| Date | Type of Exercise | Subject Matter |
| --- | --- | --- |
| June 2001 | Trial Simulation | Product Liability |
| November 2001 | Deliberation Anal. | Patent case |
| January 2002 | Trial Simulation | Breach of Contract |
| March 2002 | Jury Selection | Patent case |

After selection of the venue (step 43) and the training exercise (step 44), the user is presented with an explanation of the jury selection methodology to be used in the present instructional exercise (step 45). The methodology, as discussed above, is based on the procedures for the particular venue in question and possibly the particular judge. This information may be provided on a sequence of screens or Web pages that the user steps through on a screen-by-screen or page-by-page basis. There may also be video and/or audio clips or streaming video and/or audio providing more detailed instructions. This instructional information may have interactive capabilities to allow the user to access information relating to particular aspects or details of the jury selection procedures.

Figure 5:
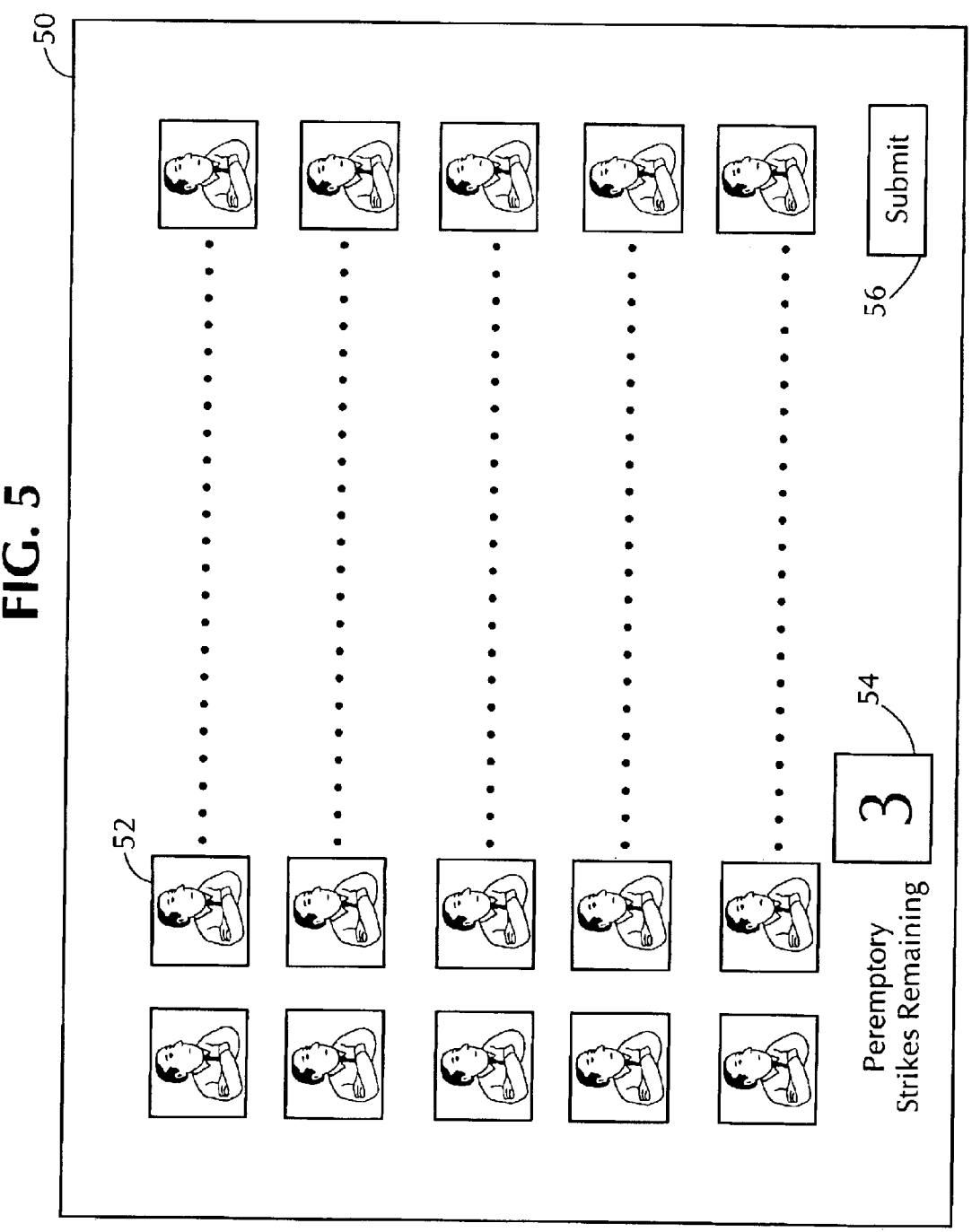
FIG. 5 is an example of a screen showing the initial juror pool.

Once the explanation of the jury selection methodology (step 45) has been completed, the user is ready to begin the jury selection process. The first step in that process is the presentation of the initial juror pool (step 46), as shown in FIG. 5. The initial juror pool 50 is presented on a screen or Web page as an array of icons 52, each of which represents a potential juror. The icons may be for example images of the individual members of the juror pool. The screen also may display the number of peremptory strikes remaining 54 and may have a "Submit" button 56 or link to complete the jury selection process. The screen also may provide a "Save" button or link (not shown) to allow an intermediate or partial jury selection to be saved for later completion and a "Cancel" button or link (not shown) to cancel any changes made since the last save. The screen also may provide a preview frame (not shown) which may present more detailed information for a potential juror as the user moves a pointing device over that juror's icon. Alternatively, the detailed information may appear as a floating frame positioned over a portion screen some distance away from the juror icon in question.

Figure 6:
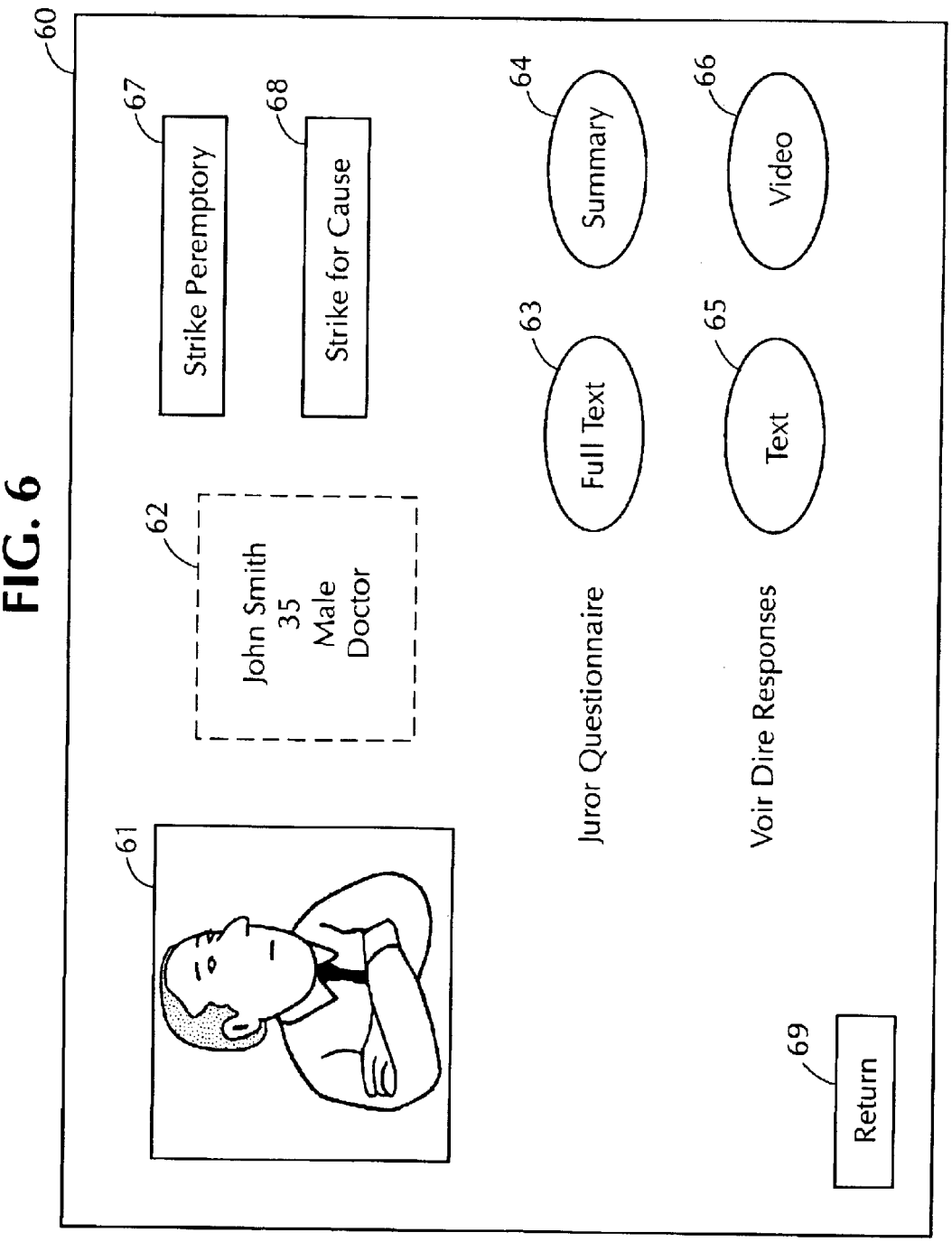
FIG. 6 is an example of a profile and strike screen for an individual juror.

Each juror icon 52 acts as a button or link to allow the user to access the respective potential juror's profile and strike screen, as shown in FIG. 6. The profile and strike screen provides information about the potential juror, such as a larger image 61 and name and basic demographic information 62 (e.g., name, age, sex, and occupation). The screen also provides access to the juror's questionnaire responses through a button or link to the full text 63 or a summary 64 and to the juror's voir dire responses through a button or link to the text 65 or a video recording 66 of the responses. In the Web site embodiment, the video recording may be downloaded or streamed in any of a variety of known fashions.

Figure 7:
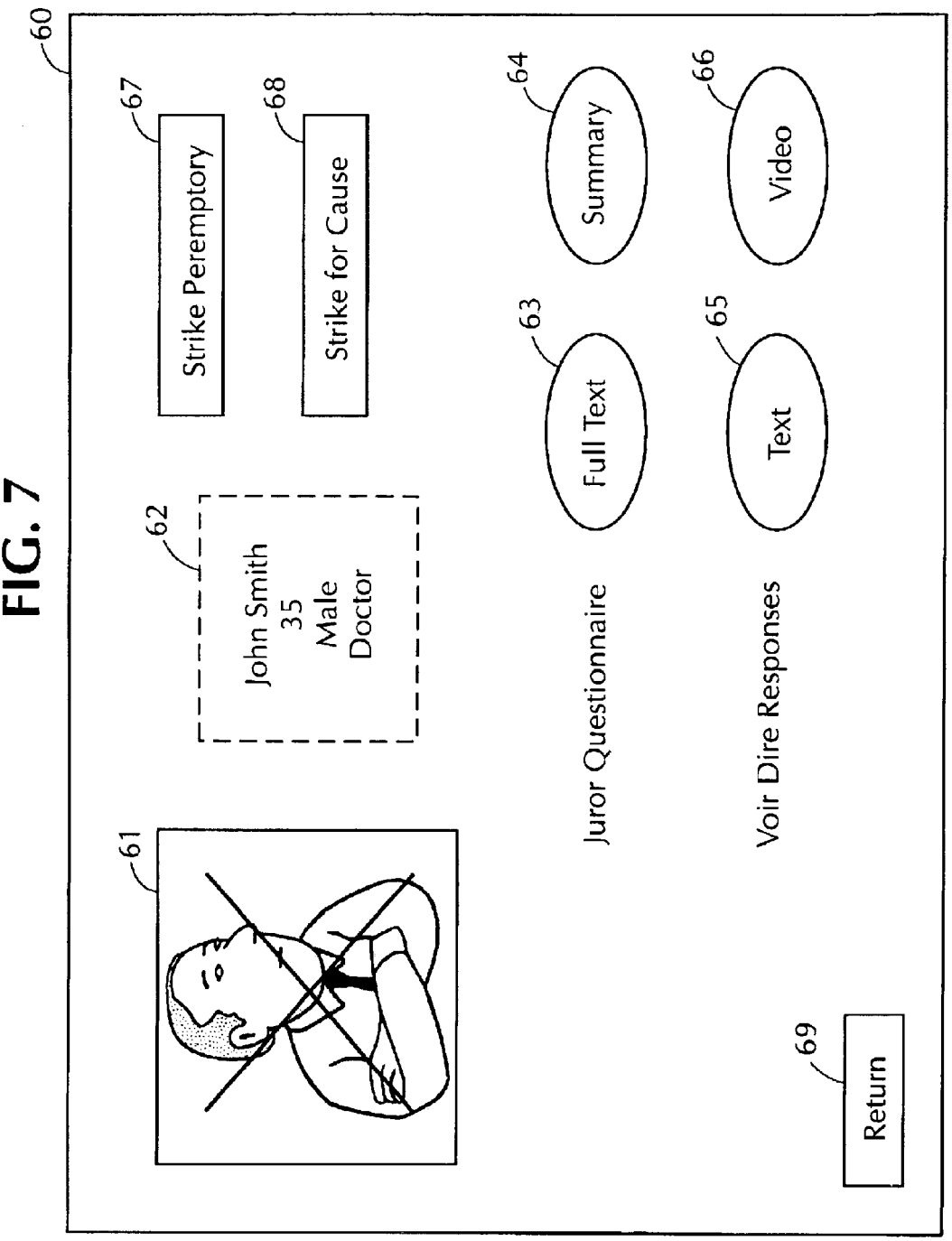
FIG. 7 is an example of a profile and strike screen for an individual juror who has been struck.

Buttons or links are provided on the profile and strike screen to allow the user to strike the potential juror with a peremptory strike 67 or a for cause strike 68. As shown in FIG. 7, an "X" appears across the potential juror's image if they have been struck. The "X" may be color-coded depending upon the type of strike, and a corresponding legend may be provided on the profile and strike screen. Alternatively, a color-coded frame may appear around the juror's image to indicate the type of strike against that juror. In addition, the strike buttons 67 and 68 may be highlighted, color-coded or represented as a depressed button when the juror has been struck. The juror may be returned to the juror pool by selecting the strike button or link a second time to deactivate the strike. Alternatively, a separate button or link (not shown) may be provided to deactivate the strike. The "Return" button or link is activated to return to the juror pool screen.

When a potential juror is struck for cause, the user is prompted with a input box or menu of choices to allow entry of the reason for striking the potential juror. The reason is evaluated in accordance with stored criteria, which may be general or may be specific to the particular venue, judge, training exercise or juror, or any combination of these factors. For example, historical data may indicate that certain judges or venues are either more or less liberal in allowing certain types of for cause strikes. As a further example, if the training exercise is based on a mock jury selection exercise, then a for cause strike for a particular potential juror may be denied if it was denied during the mock exercise. When a for cause strike is denied, the user is alerted by a warning, such as a pop-up window, and may select a displayed button or link in that window to access detailed reasons for the denial.

Similarly, when a peremptory strike is used against a potential juror, it may be evaluated in accordance with stored criteria, which may be general or may be specific to the particular venue, judge, training exercise or juror, or any combination of these factors. For example, historical data may indicate that certain judges or venues are either more or less likely to question a peremptory strike. In addition, peremptory strikes against potential jurors may be denied under certain circumstances, e.g., when the striking of the potential juror would constitute a Batson violation. As a further example, if the training exercise is based on a mock jury selection exercise, then a peremptory strike for a particular potential juror may be denied if it was denied during the mock exercise. As above, when a peremptory strike is denied, the user is alerted by a warning, such as a pop-up window, and may select a displayed button or link in that window to access detailed reasons for the denial.

Figure 8:
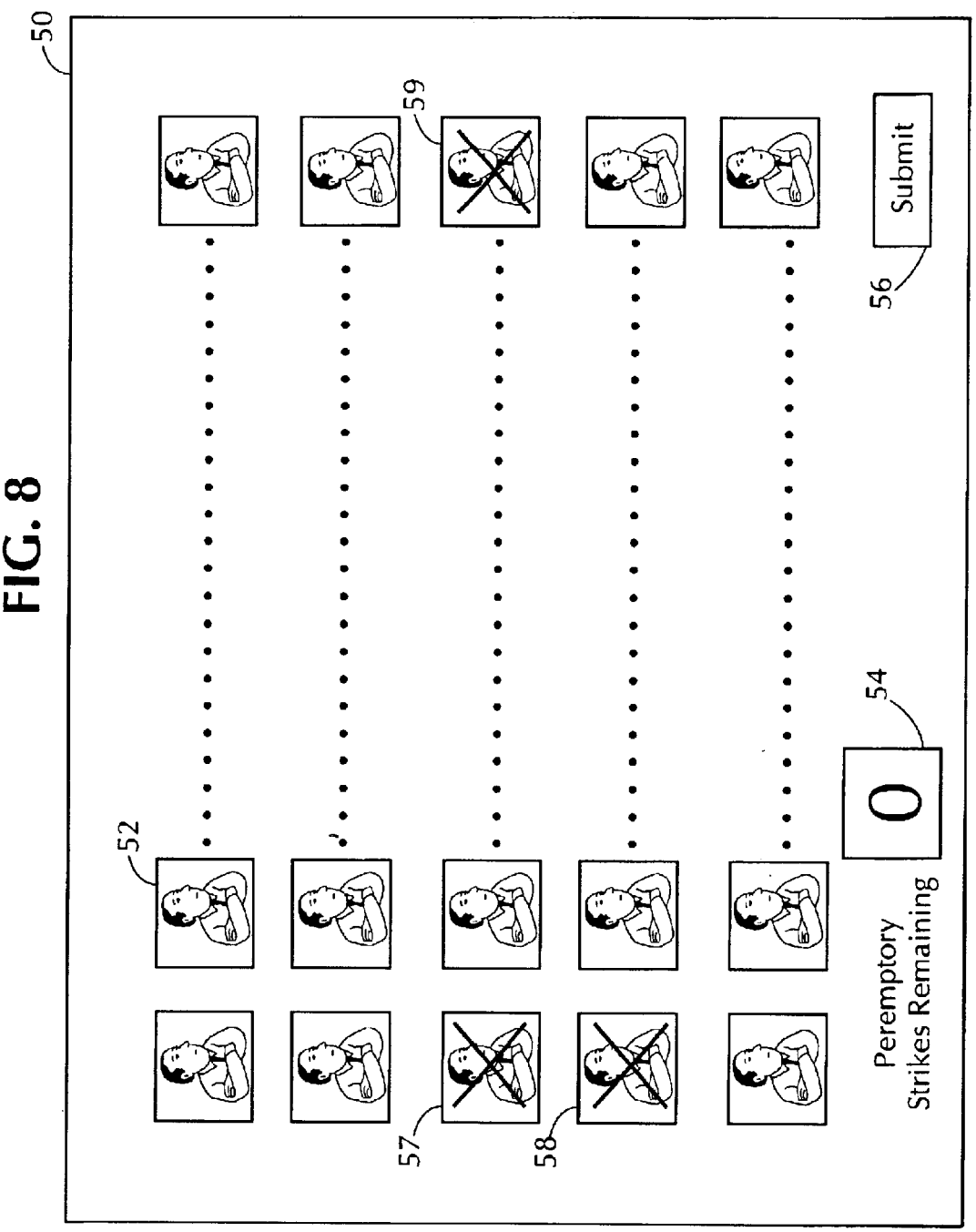
FIG. 8 is an example of a screen showing the initial juror pool after a number of jurors have been struck.

FIG. 8 shows an example of the juror pool screen after a number of strikes have been made. As discussed above with respect to the profile and strike screen, an "X" appears across the potential juror's image on the juror pool screen if they have been struck. The "X" may be color-coded depending upon the type of strike, and a corresponding legend may be provided on the juror pool screen. Alternatively, a color-coded frame may appear around the potential juror's image to indicate the type of strike against that juror. As noted above, the juror pool screen includes a counter 54 indicating the number of peremptory strikes remaining. In the example of FIG. 8, three jurors 57, 58, and 59 have been selected for peremptory strikes, so the counter 54 indicates that there are no strikes remaining. Once the user has finished the juror selection process, the submit button 56 or link is selected to begin the simulation using the selected jury.

Figure 9:
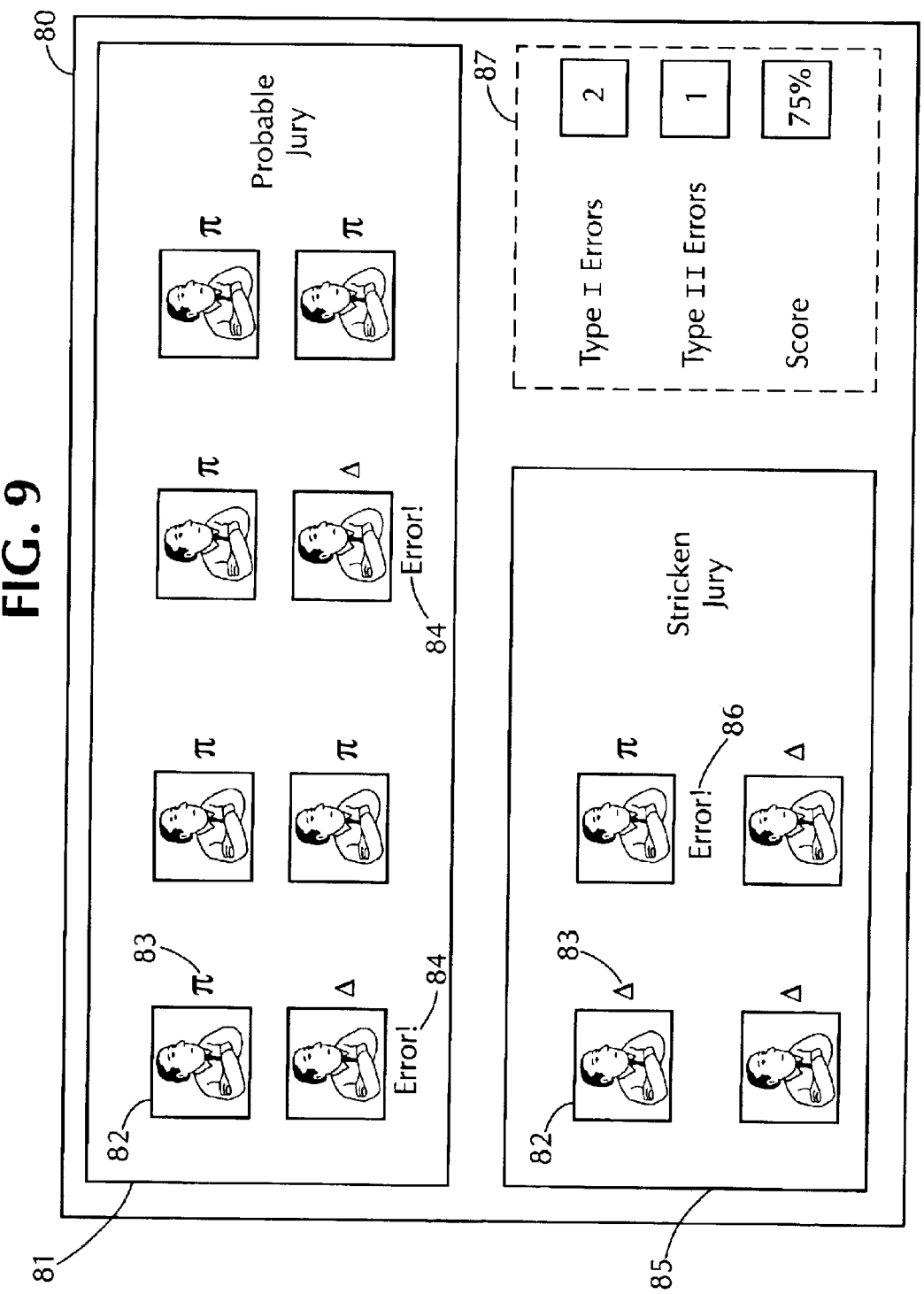
FIG. 9 is an example of a jury deliberation result screen.

FIG. 9 shows an example of the simulation result screen 80, which provides at a glance detailed information on the outcome of the jury deliberations for the probable and stricken juries. The probable juror box 81 shows juror icons 82 for the members of the probable jury, and next to each juror is an indicator 83 as to whether that juror found for plaintiff (Π) or defendant (Δ). If the juror decided against the user, such as when the user is in the role of plaintiff and the juror decides for the defendant, then an error indicator 84 appears near that juror's icon 82. Alternatively, there may be a color-coded frame around the juror's icon 82 to indicate how the juror decided and/or whether that decision is against the user. Similarly, the stricken jury box 85 shows juror icons 82 for the members of the stricken jury and corresponding indicators 83 of how each stricken juror decided. If the juror decided for the user, such as when the user is the plaintiff and the juror decides for the plaintiff, then an error indicator 86 appears near that juror's icon 82.

As discussed above, the inclusion in the probable jury of a juror who decides against the user is classified as a Type I error, and the presence in the stricken jury of a juror favorable to the user, or of a juror who does not play a significant role during deliberations, is classified as a Type II error. A score box 87 indicates the number of Type I and Type II errors and the resulting score computed therefrom. The score may simply be the percentage of probable jurors who decided for the user, which in this example would be 75%. Optionally, the score may be reduced by a factor relating to the number of Type II errors.

Figure 10:
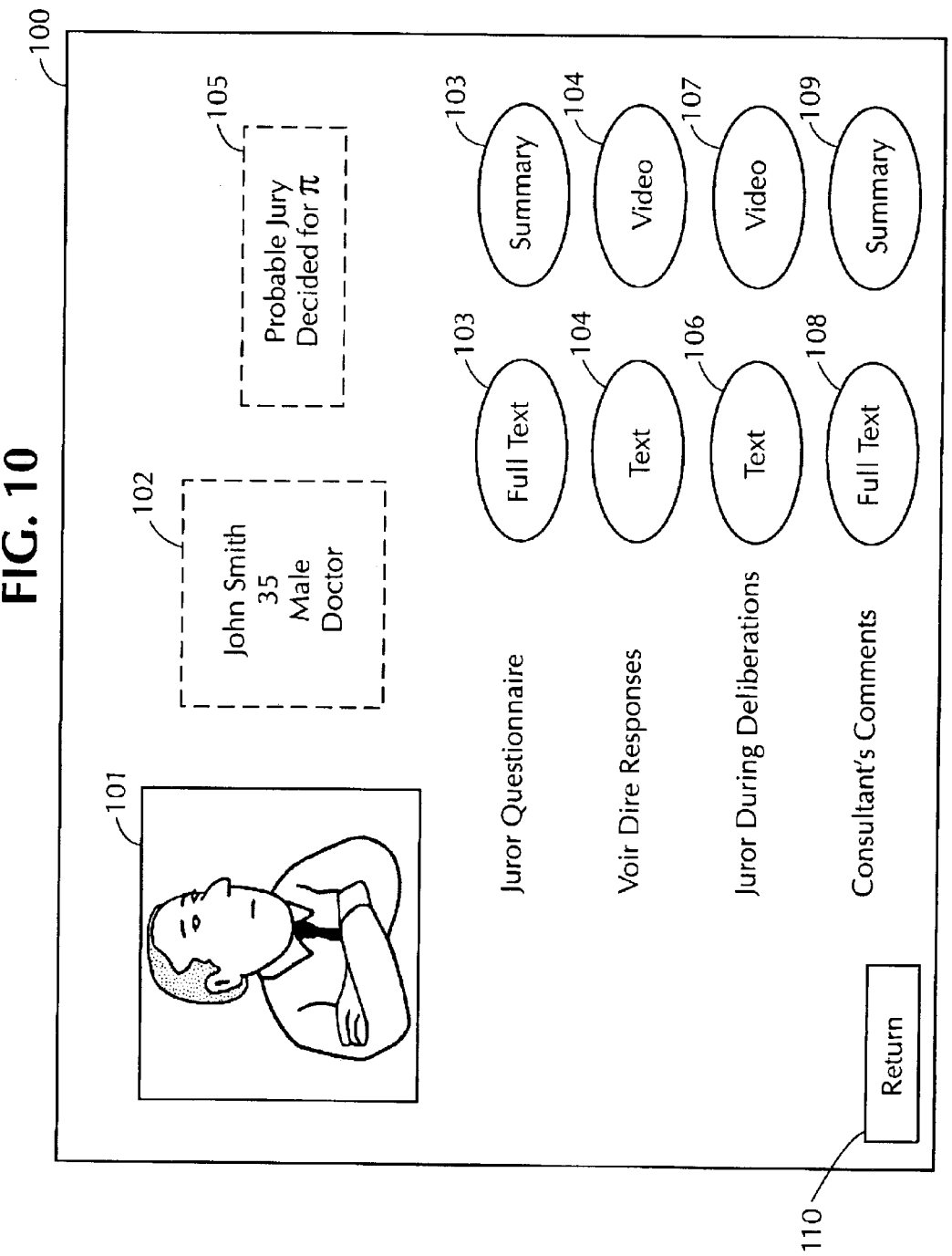
FIG. 10 is an example of a juror profile and deliberation result screen for an individual juror.

Each juror icon 82 may be selected to display a corresponding juror profile and deliberation results screen 100, as shown in FIG. 10. This screen is similar to the juror profile and strike screen (FIG. 6) in that it provides an image 101 of the juror and basic demographic information 102 (e.g., name, age, sex, and occupation), as well as providing access to text and video of the juror's questionnaire 103 and voir dire responses 104. Beyond this basic information, the juror profile and deliberation results screen 100 provides a summary of the jury deliberation results as they particularly pertain to the juror in question. For example, the screen 100 provides a juror status summary 105, which indicates whether the juror is part of the probable or stricken jury and whether they decided for plaintiff or defendant. The screen 100 also provides access to the Juror's statements during deliberation, either as text 106 or video 107 and the consultant's comments pertaining to that juror, either in full-text 108 or summary 109 form. The user may select the Return button 110 or link to return to the simulation result screen (FIG. 9).

The foregoing detailed description is intended to be illustrative and not limiting of the present invention, which is defined by the claims set forth below.

What is claimed is:

1. A computer-implemented method of conducting a jury selection training exercise for a user based on mock trial data, the method comprising:

presenting juror data for an initial pool of potential jurors on a computer display;

providing juror questionnaire response data for members of the initial pool on the computer display, the questionnaire including at least one question typical of a venire during an actual trial;

allowing the user to strike members of the initial pool for cause using a computer input device;

allowing the user to make up to a predetermined permitted number of peremptory strikes of members of the initial pool using the computer input device, the predetermined permitted number of peremptory strikes corresponding to a maximum number of peremptory strikes permitted at the actual trial;

assembling, through computer processing, a probable jury comprising members of the initial pool not struck for cause and not struck using a peremptory strike;

assembling, through computer processing, a stricken jury comprising members of the initial pool struck for cause or struck using a peremptory strike;

presenting jury deliberation results to the user on the computer display, the deliberation results comprising a decision made by each juror of the probable jury and each juror of the stricken jury.

2. The method according to claim 1, further comprising providing videotape of the deliberations of the probable jury and the deliberations of the stricken jury.

3. The method according to claim 1, further comprising:

providing post-deliberation interview data for a plurality of members of the probable jury; and providing post-deliberation interview data for a plurality of members of the stricken jury.

4. The method according to claim 1, wherein the juror questionnaire response data for members of the initial pool is based on responses of members of the initial pool to a written questionnaire.

5. The method according to claim 1, wherein the juror questionnaire response data for members of the initial pool is based on orally examining members of the initial pool by a mock judge presiding over a mock trial exercise.

6. The method according to claim 1, wherein the striking of a member of the initial pool for cause is requested by the user and is allowed based on a ruling made by a mock judge presiding over a mock trial exercise.

7. The method of claim 1, further comprising providing analysis of behavior of the members of the probable jury during deliberations to identify any errors that have been made in failing to strike an opposition juror.

8. The method according to claim 7, wherein the analysis of behavior of the members of the probable jury during deliberations is based on interviews of identified opposition jurors following deliberations.

9. The method of claim 1, further comprising providing analysis of behavior of the members of the stricken jury during deliberations to identify any errors that may have been made in striking a favorable juror.

10. The method according to claim 9, wherein the analysis of behavior of the members of the stricken jury during deliberations is based on interviews of the identified favorable jurors following deliberations.

11. A computer-implemented method of conducting a jury selection training exercise for a user based on mock trial data, the method comprising:

presenting a juror pool data screen on a computer display for an initial pool of potential jurors;

indicating, on the juror pool data screen, members of the initial pool who have been struck for cause;

indicating, on the juror pool data screen, members of the initial pool who have been struck using a peremptory strike;

presenting on the computer display a probable jury comprising members of the initial pool not struck for cause and not struck using a peremptory strike;

presenting on the computer display a stricken jury comprising members of the initial pool struck for cause or struck using a peremptory strike;

presenting jury deliberation results to the user on the computer display, the deliberation results comprising a decision made by each juror of the probable jury and each juror of the stricken jury.

12. The method according to claim 11, wherein the juror pool data screen includes icons representing each member of the initial pool.

13. The method according to claim 11, further comprising presenting an individual juror data screen for a member of the initial pool based on a selection made by the user on the juror pool data screen.

14. The method according to claim 11, wherein the step of presenting jury deliberation results to the user comprises the step of presenting a jury deliberation results screen summarizing the decisions made by jurors of the probably jury or jurors of the stricken jury or both.

15. The method according to claim 14, further comprising presenting an individual juror result data screen for a member of the probable jury or the stricken jury based on a selection made by the user on the jury deliberation results screen.

16. The method according to claim 11, further comprising presenting a score based on the decisions made by jurors of the probable jury.

17. The method according to claim 16, wherein the score is based in part on the decisions made by jurors of the stricken jury.

18. A computer program product including instructions stored in a computer-readable medium, the instructions comprising:

code for presenting juror data for an initial pool of potential jurors;

code for providing juror questionnaire response data for members of the initial pool, the questionnaire including at least one question typical of a venire during an actual trial;

code for allowing the user to strike members of the initial pool for cause, in a manner that resembles as closely as possible a manner in which members of the venire would be struck for cause during the actual trial;

code for allowing the user to make up to a predetermined permitted number of peremptory strikes of members of the initial pool, the predetermined permitted number of peremptory strikes corresponding to a maximum number of peremptory strikes at the actual trial;

code for assembling a probable jury comprising members of the initial pool not struck for cause and not struck using a peremptory strike;

code for assembling a stricken jury comprising members of the initial pool struck for cause or struck using a peremptory strike;

code for presenting jury deliberation results to the user, the deliberation results comprising a decision made by each juror of the probable jury and each juror of the stricken jury.

19. The computer program product according to claim 18, further comprising code for providing videotape of the deliberations of the probable jury and the deliberations of the stricken jury.

20. The computer program product according to claim 18, further comprising:
    code for providing post-deliberation interview data for a plurality of members of the probable jury; and
    code for providing post-deliberation interview data for a plurality of members of the stricken jury.

21. The computer program product according to claim 18, wherein the juror questionnaire response data for members of the initial pool is based on responses of members of the initial pool to a written questionnaire.

22. The computer program product according to claim 18, wherein the juror questionnaire response data for members of the initial pool is based on orally examining members of the initial pool by a mock judge presiding over a mock trial exercise.

23. The computer program product according to claim 18, wherein the striking of a member of the initial pool for cause is requested by the user and is allowed based on a ruling made by a mock judge presiding over a mock trial exercise.

24. The computer program product of claim 18, further comprising code for providing analysis of behavior of the members of the probable jury during deliberations to identify any errors that have been made in failing to strike an opposition juror.

25. The computer program product according to claim 24, wherein the analysis of behavior of the members of the probable jury during deliberations is based on interviews of identified opposition jurors following deliberations.

26. The computer program product of claim 18, further comprising code for providing analysis of behavior of the members of the stricken jury during deliberations to identify any errors that may have been made in striking a favorable juror.

27. The computer program product according to claim 26, wherein the analysis of behavior of the members of the stricken jury during deliberations is based on interviews of the identified favorable jurors following deliberations.

28. A computer program product, including instructions stored in a computer-readable medium, for conducting a jury selection training exercise for a user based on mock trial data, the instructions comprising code for:
    presenting a juror pool data screen for an initial pool of potential jurors;
    indicating, on the juror pool data screen, members of the initial pool who have been struck for cause;
    indicating, on the juror pool data screen, members of the initial pool who have been struck using a peremptory strike;
    presenting a probable jury comprising members of the initial pool not struck for cause and not struck using a peremptory strike;
    presenting a stricken jury comprising members of the initial pool struck for cause or struck using a peremptory strike;
    presenting jury deliberation results to the user, the deliberation results comprising a decision made by each juror of the probable jury and each juror of the stricken jury.

29. The computer program product according to claim 28, wherein the juror pool data screen includes icons representing each member of the initial pool.

30. The computer program product according to claim 28, further comprising code for presenting an individual juror data screen for a member of the initial pool based on a selection made by the user on the juror pool data screen.

31. The computer program product according to claim 28, wherein the code for presenting jury deliberation results to the user comprises code for the presentation of a jury deliberation results screen summarizing the decisions made by jurors of the probably jury or jurors of the stricken jury or both.

32. The computer program product according to claim 31, further comprising code for presenting an individual juror result data screen for a member of the probable jury or the stricken jury based on a selection made by the user on the jury deliberation results screen.

33. The computer program product according to claim 28, further comprising code for presenting a score based on the decisions made by jurors of the probable jury.

34. The computer program product according to claim 33, wherein the score is based in part on the decisions made by jurors of the stricken jury.

35. A system for conducting a jury selection training exercise for a user based on mock trial data, the system comprising:
    a client computer configured to present juror pool data for an initial pool of potential jurors, allow the user to strike members of the initial pool for cause or using a peremptory strike, and present jury deliberation results to the user; and
    a database server configured to store the juror pool data and transmit the juror pool data to the client computer,
    wherein the deliberation results include a decision made by each juror of a probable jury comprising members of the initial pool not struck for cause and not struck using a peremptory strike and each juror of a stricken jury comprising members of the initial pool struck for cause or struck using a peremptory strike.

36. The system according to claim 35, wherein the database server stores individual juror result data for a member of the probable jury or the stricken jury and the client computer presents the individual juror result data to the user.

37. The system according to claim 36, wherein the individual juror result data comprises video of deliberation by the member of the probable jury or the stricken jury.

38. The system according to claim 35, wherein the client computer is connected to the database server via a Web server.

* * * * *

UNITED STATES PATENT AND TRADEMARK OFFICE
CERTIFICATE OF CORRECTION

PATENT NO. : 7,284,985 B2  Page 1 of 1
APPLICATION NO. : 10/465434
DATED : October 23, 2007
INVENTOR(S) : Louis Genevie It is certified that error appears in the above-identified patent and that said Letters Patent is hereby corrected as shown below:

ON THE TITLE PAGE, ITEM (54) AND COL. 1, LINE 1,

"COMPUTER-IMPLEMENTED METHOD FOR CONDUCTING A JURY SELECTION TRAINING EXERCISE BASED ON MOCK TRAIL DATE" should read --COMPUTER-IMPLEMENTED METHOD FOR CONDUCTING A JURY SELECTION TRAINING EXERCISE BASED ON MOCK TRIAL DATA--.

Signed and Sealed this

Eighth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,284,985 B2
APPLICATION NO. : 10/465434
DATED : October 23, 2007
INVENTOR(S) : Genevie It is certified that error appears in the above-identified patent and that said Letters Patent is hereby corrected as shown below:

The title page:
Item (54) and column 1 line 4 should read -- COMPUTER IMPLEMENTED METHOD FOR CONDUCKING A JURY SELECTION TRAINING EXERCISE BASED ON MOCK TRIAL DATA Signed and Sealed this Fifth Day of August, 2008

JON W. DUDAS
*Director of the United States Patent and Trademark Office*

(12) United States Patent
Genevie

(10) Patent No.: US 7,284,985 B2
(45) Date of Patent: *Oct. 23, 2007

(54) COMPUTER-IMPLEMENTED METHOD FOR CONDUCTING A JURY SELECTION TRAINING EXERCISE BASED ON MOCK TRIAL DATA

(76) Inventor: Louis Genevie, 340 W. 57th St., Suite 2A, New York, NY (US) 10019

(*) Notice: Subject to any disclaimer, the term of this patent is extended or adjusted under 35 U.S.C. 154(b) by 491 days.

This patent is subject to a terminal disclaimer.

(21) Appl. No.: 10/465,434

(22) Filed: Jun. 19, 2003

(65) Prior Publication Data

US 2004/0002044 A1 Jan. 1, 2004

Related U.S. Application Data

(63) Continuation-in-part of application No. 10/007,947, filed on Dec. 3, 2001, now Pat. No. 6,607,389.
(60) Provisional application No. 60/309,511, filed on Aug. 3, 2001.

(51) Int. Cl.
B09B 19/00 (2006.01)

(52) U.S. Cl. .......................................... 434/235
(58) Field of Classification Search ........ 434/235–236; 705/1, 12, 500
See application file for complete search history.

(56) References Cited

U.S. PATENT DOCUMENTS

| | | | |
|---|---|---|---|
| 5,444,615 A | 8/1995 | Bennett et al. | 364/401 |
| 5,815,392 A | 9/1998 | Bennett et al. | 364/401 |
| 5,940,800 A | 8/1999 | Bennett et al. | 705/1 |
| 6,091,408 A | 7/2000 | Treibitz et al. | 345/329 |
| 6,125,340 A | 9/2000 | Miles | 702/181 |
| 6,205,323 B1 | 3/2001 | Mayo, Jr | 455/38.2 |
| 6,607,389 B2 * | 8/2003 | Genevie | 434/235 |
| 2001/0053967 A1 * | 12/2001 | Gordon et al. | 783/22 |
| 2003/0018520 A1 | 1/2003 | Rosen | 705/12 |
| 2004/0054546 A1 * | 3/2004 | Levin et al. | 705/1 |

FOREIGN PATENT DOCUMENTS

WO WO 01/43050 A1 6/2001

OTHER PUBLICATIONS

Gobert, James J. et al., "Jury Selection: The Law, Art, and Science of Selecting a Jury", Second Edition, Shepard's/McGraw-Hill, Inc., pp. 128–140.

* cited by examiner

*Primary Examiner*—Kim Nguyen
(74) *Attorney, Agent, or Firm*—Fitzpatrick, Cella, Harper & Scinto

(57) ABSTRACT

A computer-implemented method of conducting a jury selection training exercise for a user based on mock trial data. The method includes presenting juror data for an initial pool of potential jurors on a computer display and providing juror questionnaire response data. The user is allowed to strike members of the initial pool for cause using a computer input device and to make up to a predetermined permitted number of peremptory strikes of members of the initial pool. A probable jury is assembled through computer processing that includes members of the initial pool not struck for cause and not struck using a peremptory strike. A stricken jury is assembled through computer processing that includes members of the initial pool struck for cause or struck using a peremptory strike. Jury deliberation results are presented to the user, including a decision made by each juror of the probable and stricken juries.

38 Claims, 10 Drawing Sheets

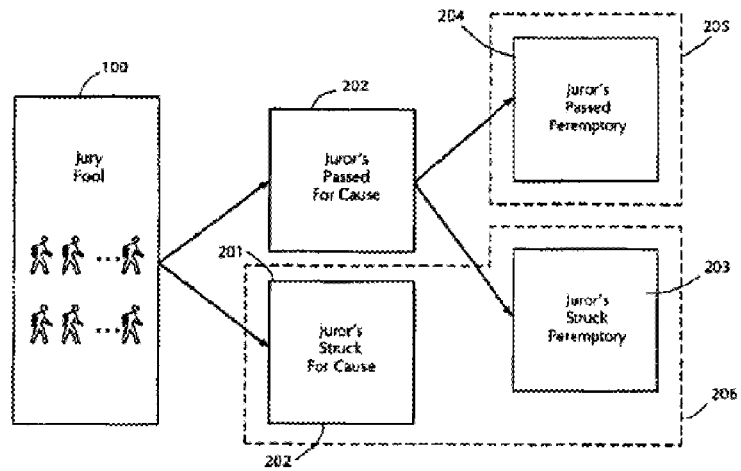

COMPUTER-IMPLEMENTED METHOD FOR CONDUCTING A JURY SELECTION TRAINING EXERCISE BASED ON MOCK TRIAL DATA

CROSS-REFERENCE TO RELATED APPLICATIONS

This application is a continuation-in-part of U.S. patent application Ser. No. 10/007,947, now U.S. Pat. No. 6,607,389, filed Dec. 3, 2001 which in turn claims the benefit of U.S. Provisional Application Ser. No. 60/309,511, filed Aug. 3, 2001; both of which are hereby incorporated by reference in their entirety.

BACKGROUND OF THE INVENTION

1. Field of the Invention

This present invention relates to systems and methods, including computer systems and methods, for conducting jury research. More specifically, the present invention relates to processes for providing experiential voir dire training for trial attorneys; for generating research data and analytic tools that help prepare attorneys for more accurate decision making during the actual trial; and to computer systems and methods for simulating a jury selection exercise using real-world data.

2. Description of Related Art

Over the years, jury consultants have played an increasingly important role in developing strategies and tactics for both civil and criminal litigations. Speaking generally, jury consultants assist attorneys by identifying and applying information concerning the beliefs, attitudes and characteristics of potential jurors. Conventional services provided by jury consultants include focus groups, mock trials, opening statement consultations, community attitude surveys, graphics support, witness assessment preparation and the like. In essence, the jury consultant serves as an interface between the attorney and the jury pool, assisting the attorney by making recommendations for getting points across in a persuasive and effective manner.

Conventional methods employed by jury consultants tend to focus on strategy development, and statistical analysis that attempts to model juror types. For example, in a conventional mock trial exercise, the jury consultant attempts to construct a jury that is a random and representative sample of the overall jury pool in the relevant area (a "representative jury"). The construction of such a representative jury often begins with a telephone survey, in which a statistically significant sample of the community in which the case is to be tried is questioned, to determine its attitude patterns and demographic make-up. Depending on the specific nature of the case, the survey may focus on a variety of factors, including marital status, occupation, membership in community groups and the like, as well as other factors more specifically related to the particular case. The jury consultant then makes an effort to construct a representative jury that mirrors that community's profile.

A mock trial is then conducted before the representative jury, in which both the plaintiff's (or prosecutor's) and defendant's sides of the case are presented. Following the mock trial, the representative jury deliberates and renders a verdict. Each member of the representative jury is then polled and interviewed, to elicit his or her reactions to what was presented. The jury consultant compiles and analyzes that data from such interviews, and makes recommendations to the attorney concerning the manner in which the case may be most effectively presented. Data concerning biases and characteristics of jurors that may help or hurt the case is also analyzed.

For example, following an observation of the mock deliberations, the jury consultant may conclude that an aggressive cross-examination of a particular witness did not sit well with the jury, and in fact alienated the cross-examining attorney from its sympathies, and therefore recommend that a less aggressive approach to the cross be taken. By way of another example, the exercise outlined above may reveal that seventy percent of the representative jurors who were blue-collar workers found for the plaintiff, while eighty percent of the representative jurors who were white collar workers found for the defendant. From this data, the jury consultant may conclude that there are strong corresponding pro-plaintiff and pro-defendant biases in the subject case, and recommend to the attorney that his peremptory strikes (i.e., strikes as to which a showing of cause is not required) be used accordingly.

Over the long run, the statistical data obtained using the representative jury approach described above may prove useful, and conventional jury consultant have in fact provided valuable and necessary services to attorneys trying cases. However, even the strongest correlation between jurors' decision making and various aspects of their background, attitudes and experiences provides nothing more than probabilities, and falls short when tested against the complexity of decision making during voir dire. This drawback is even more acute when one considers that it is individuals who do not think like everyone else, and therefore do not conform to the probability data, who tend to become leaders in jury deliberations. These factors severely limit the usefulness of probability data in conducting a voir dire. In the end, no matter how much statistical data one has available, counsel are still required to rely on personal judgment, experience and so-called gut instincts when making actual jury selection determinations.

Despite these truisms, there has been very little qualitative research focused on the critical area of jury selection. Moreover, no systems or methods have been heretofore developed for effectively training an attorney to make jury selections in the specific case he will be trying, or for constructing a mock jury which mirrors the jury that will hear the case more accurately than the representative jury of the prior art. It has been suggested to conduct mock voir dires to generate the mock jury for a mock trial. See *Jury Selection The Law, Art, and Science of Selecting a Jury*, 2nd Ed., J. J. Gobert and W. E. Jordan (Shepard's/McGraw Hill 1990) at 130-131. However, no systematic approaches for conducting such mock voir dires, and for analyzing and utilizing the resultant data, have been heretofore developed. Moreover, such practices have been criticized as being time consuming. Id.

Also, an attorney training organization the National Institute for Trial Advocacy (NITA) has offered programs in which mock voir dires are conducted. At the NITA program, an attorney being trained conducts a mock voir dire before a trial advocacy instructor or a professional communicator, with the end product of the exercise being a a critique on the attorney's questions and presentation skills. The NITA programs, however, do not at all focus on the gathering and analysis of data from the mock voir dire process.

There is a need, therefore, for a system and method that fills these voids, and provides a trial attorney with formal voir dire training, while at the same time developing an ever more refined set of analytic and data gathering tools for improving voir dire practice.